United States Patent

Brownscombe

[15] 3,667,695
[45] June 6, 1972

[54] REELING APPARATUS WITH DYNAMIC VIBRATION ABSORBER

[72] Inventor: Philip J. Brownscombe, Millington, N.J.
[73] Assignee: Eugene Dietzgen Co., Chicago, Ill.
[22] Filed: Feb. 16, 1970
[21] Appl. No.: 11,471

[52] U.S. Cl. .................................. 242/55, 242/179, 74/574
[51] Int. Cl. .................. B65h 75/02, G03b 1/04, B65h 75/34
[58] Field of Search ....................... 242/54, 55, 205, 210, 179; 74/574; 226/13, 60, 61

[56] References Cited

UNITED STATES PATENTS 2,794,605   6/1957   Minter .................................. 242/207
3,203,636   8/1965   Owen .................................... 242/203

Primary Examiner—Leonard D. Christian
Attorney—Johnston, Root, O'Keeffe, Keil, Thompson & Shurtleff

[57] ABSTRACT

Reeling apparatus adapted for feeding reeled film between reels, film cartridges, etc. in either direction and uses thereof in image projection devices. The film reels are driven by respective electric motor-driven spindles having in the spindle drive a dynamic vibration absorber which resonates at sixty cycles per second to eliminate jittering at slow speed film drive of an image projected on a screen.

12 Claims, 8 Drawing Figures

INVENTOR
PHILIP J. BROWNSCOMBE

INVENTOR
PHILIP J. BROWNSCOMBE
ATTORNEYS

REELING APPARATUS WITH DYNAMIC VIBRATION ABSORBER

The reeling apparatus of the subject invention concerns improvements in the spindle drives for advance and rewind film reels or magazines. One system for storing graphic information in a compact form is the photographing of such information on long film strips which, in turn, are stored on reels or in film magazines or cartridges. Each frame is a photo-reproduction of a given piece of graphic information.

When such information is to be retrieved, the reel cartridge or magazine is placed on a film reader and the film is driven across a projection head and projected onto a viewing screen. The information retrieval process involves feeding the film across the projection head until the desired frame or frames is found.

BRIEF DESCRIPTION OF THE INVENTION

The subject invention concerns improvements in reeling apparatus embodying electric drive motors on the take-up and rewind spindles. The electrical control system for the motors embodies a potentiometer-controlled variable AC drive. One of the improvements in the subject invention concerns the provision of a dynamic vibration absorber in the mechanical drive between each electric motor and its respective spindle. This absorber comprises a metal ring mounted by curved spring wires on the motor drive shaft, i.e., on the concentric hub of the pinion of the electric motor drive shaft. The mass of the metal ring, the arcuate shape of the spring wires and the diameters of these wires are selected so that the dynamic vibration absorber has a resonance of sixty cycles per second. Its function is to absorb pulsating energy from the respective electric motors so that this pulsating energy is not transmitted to the film drive. If the latter were to occur, the image projected onto the screen of the viewer would have a significant jitter, particularly at low speed drive of the film across the projection head. The spring wires lie in a plane substantially normal to the axis of rotation of the electric motor drive spindle. The cover an arc of 270°, and their respective ends are staked or otherwise secured in the hub and in the ring at right angles to each other.

DESCRIPTION OF THE DRAWINGS

The reeling apparatus of the invention and the use thereof in a film reader are illustrated in the drawings in a preferred embodiment thereof, wherein.

DESCRIPTION OF THE PREFERRED EMBODIMENT

Figure 1:
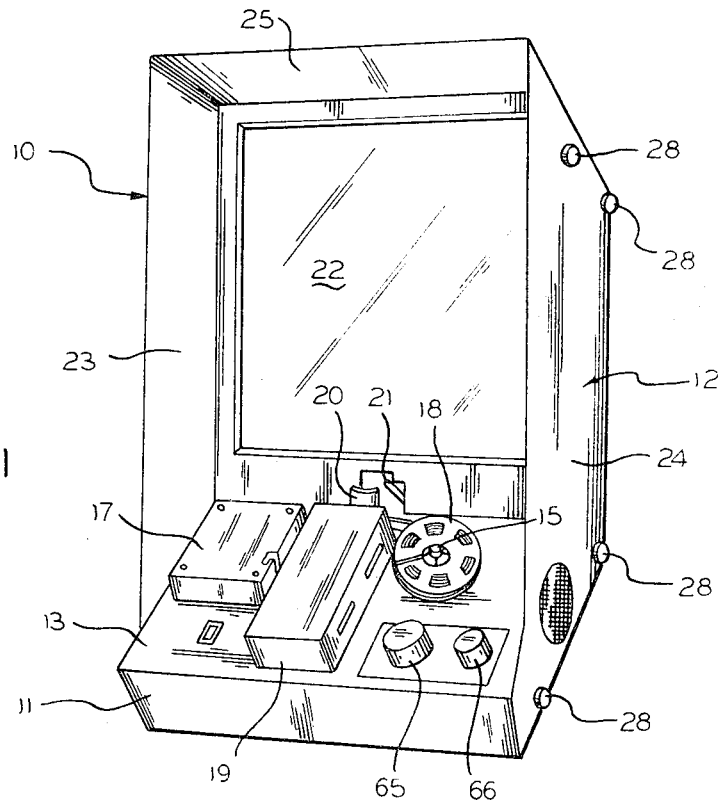
FIG. 1 is a front perspective view of a film reader cabinet.
Figure 2:
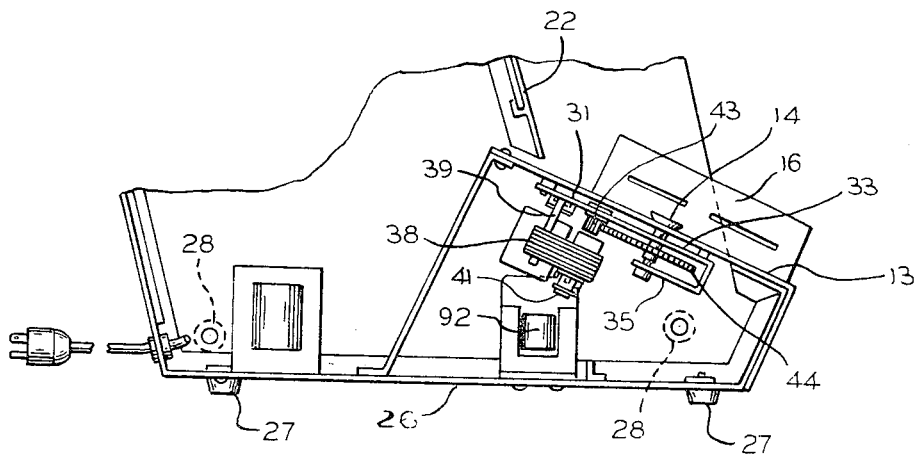
FIG. 2 is a fragmentary vertical section of the lower portion thereof.
Figure 3:
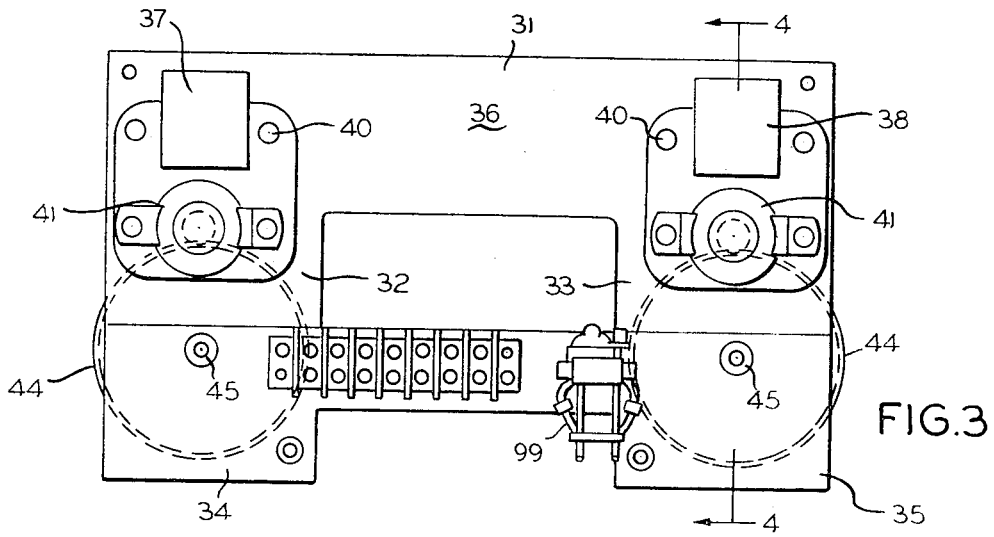
FIG. 3 is a bottom plan view of the spindle drive mechanism and its mounting plate.
Figure 5:
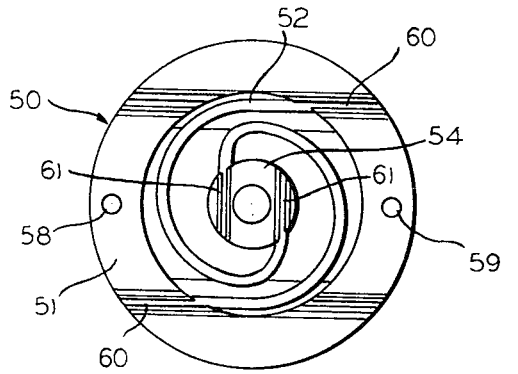
FIGS. 5–7 respectively are top and bottom plan views and a side elevation of a preferred dynamic vibration absorber.
Figure 4:
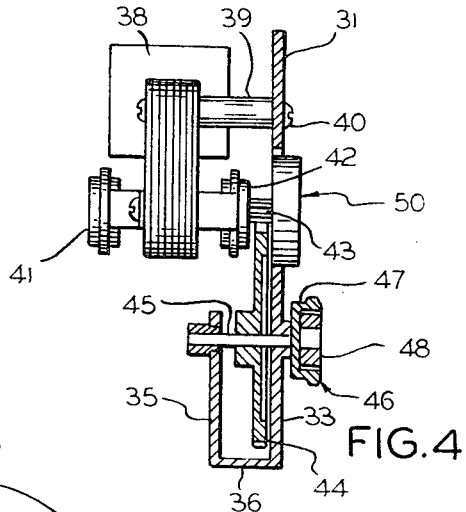
FIG. 4 is a section taken on section plane 4—4 of FIG. 3.
Figure 6:
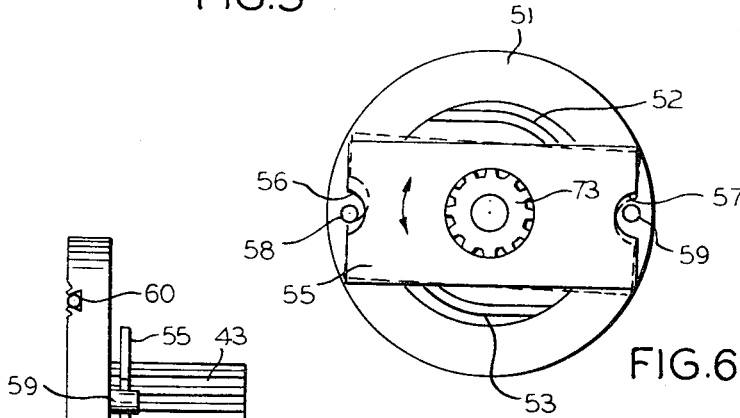
Figure 7:
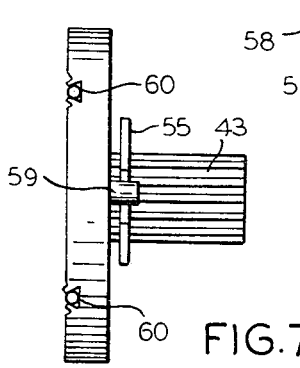

The film reader of the invention comprises a cabinet 10 comprising a base portion 11 and an image projection segment 12. The base portion 11 has a sloping front panel 13. It is arranged with a pair of film drive spindles 14 and 15. Where the reader is equipped for handling film would in film cartridges or magazines, the left-hand spindle 14 may have a cartridge or magazine holding assembly 16 associated therewith. A film cartridge or magazine 17 is mounted in the latter assembly and a take-up reel or spool 18 is mounted on the right-hand spindle 15 (FIG. 1).

Interposed between the cartridge 17 and the reel or spool 18 is a light projection unit within the removable cover 19.

Light from a lamp-mirror-lens assembly (not shown) is projected through a film guide and focusing lens unit 20. This film guide and focusing lens unit does not constitute a part of the subject invention per se. It is described in detail in application, Ser. No. 524,123 of Philip J. Brownscombe, the disclosure of which is incorporated herein by reference. It includes a focusing lens positioned in a cylindrical focusing lens barrel which is slidably held in the cylindrical housing. The focusing lens barrel is moved back and forth in the cylindrical opening by manual movement of a pivotable, focusing arm 21.

The light projected from the lamp passes through the film and guide unit 20 and the focusing lens in the barrel into the interior of the cabinet 10. The image is directed against the planar mirror (not shown) from which it is then reflected onto the translucent viewing screen 22.

The side walls 23 and 24 and the top wall 25 of the cabinet preferably project forwardly beyond the screen 22 to provide a light screen or hood. The bottom wall 26 has four pads or feet 27 and the side wall 24 also has pads or feet 28. The cabinet 10 normally sits on the bottom feet 27, but where a particular frame of the film strip is oriented so that its projected image reads vertically instead of horizontally, the cabinet 10 may then be laid on the side feet 28 so that the projected image or series of images can be read or viewed more easily.

The drive for the spindles constitutes a pair of electric motors and gears assembled as a unit on the spindle drive mounting plate 31. This plate has a pair of upper arms 32 and 33 and a pair of shorter lower arms 34 and 35 connected by a U-shaped center segment 36. The electric drive motors 37 and 38 are suspended by mounting posts 39 and screws 40 on the arms 32 and 33. The drive shafts of the motors are rotatably journalled in hubs 41 and 42. These drive shafts each have a pinion 43 at the upper end thereof which, in turn, drives the spindle shaft drive gear 44 which is coupled to the respective spindle shaft 45. The latter is rotatably journalled in the respective upper and lower arms 32,34 or 33,35. The shafts 45 carry at their upper ends magnetic couplers 46, which are composed of a hollow disc 47 containing a ring or wafer 48 made of permanently magnetic material. The latter serves as a magnetic coupling between the spindle and the reel or cartridge mounted thereon. The reel or cartridge is coupled with the spindle directly on the magnetic coupling or via a spindle adapter which comprises a metal ring and a square stub shaft (not shown). The adapter is magnetically coupled to the spindle 45 via the magnet 48. This coupling has the advantage over a direct mechanical coupling in that the adapter can slip relative to the spindle 45 in the event of sudden, high torque therebetween, the latter being particularly a problem during braking at the higher speeds of rotation. Since the torque which may be exerted by the magnet is limited, it follows that the forces in the film are limited and cannot exceed the magnetic force — in effect a torque limited slip clutch is provided.

The forward drive always uses the separable spindle adapter. The rewind drive uses the separable spindle adapter only when the film to be viewed is wound on standard 16mm film spools. When the film is one type of standard cartridge, the separable spindle is removed and the magnet directly engages a steel plate in the bottom of the cartridge. Another standard type cartridge requires a special adapter (not shown) which is engaged by the spindle magnet and in turn engages, through a magnet and pins in the adapter, a steel plate in the cartridge. When using standard 16mm film width as a leader, a standard commercial, 16-mm take-up spool is used on the forward spindle. When the cartridge uses a plastic strip leader somewhat wider than the 16-mm film, this requires a special take-up spool.

The pinion on each drive motor has mounted on the upper end thereof a dynamic vibration absorber 50. This dynamic vibration absorber comprises a brass ring 51 which is mounted by curved spring wires 52 and 53 on the concentric hub 54 of pinion 43. A plate 55, which has semi-circular recesses 56 and 57 in axially opposite ends thereof, is fixedly mounted on pinion 43. These recesses coact with pins 58 and 59 projecting downwardly from the lower face of the ring 51 at diametrically opposite positions. The hub 54 is fixed to or made an integral part of the pinion 43 on each motor drive shaft. The metal ring 51 is thus resiliently supported on the motor drive shaft and may rotate relative to the drive shaft within the limits of the edges of grooves 56 and 57 and their respective stop pins 58 and 59.

The weight of the metal ring 51, the arcuate shape of the spring wires 52 and 53 and the diameters of said wires are selected so that the dynamic vibration absorber has a resonance of sixty cycles per second, which is the frequency of the usual alternating current in this country. This absorber therefore resonates at the same frequency and limits the pulsating energy which is transmitted from the AC driven motors to the film drive. Without the dynamic vibration absorber, the pulsating energy transmitted to the film drive appears on the screen as a jitter.

It is important that the spring wires 52 and 53 lie in a plane normal to the axis of rotation of the motor drive spindle and that they do not vary significantly from this plane in their arcuate bends. The ends of the spring wires are staked in grooves 60 and 61 in the upper faces of ring 51 and hub 54 extending as respectively parallel chords thereacross. The grooves 60 and 61 are substantially at right angles to each other, and the curves of respective spring wires 52 and 53 cover an arc of about 270° between staked ends thereof.

The electric circuitry for controlling the speed of and direction of the respective electric motors may be any conventional circuitry for the purposes of the subject invention. However, it is preferred that such circuitry be of the type illustrated in FIG. 8. Briefly this electric motor control means includes a high speed drive circuit and a low speed drive circuit operatively connected with each motor. Upon switching off the high speed drive circuit, electrically operable means, e.g., a capacitor in parallel with a relay and appropriate control switches, briefly activates the low speed drive circuit and briefly applies to both motors a low speed drive impulse to brake both motors for a brief interval. The motor circuitry is manually controlled by the five-position selector switch knob 65 to provide high speed forward, low speed forward, off, low speed rewind and high speed rewind. A potentiometer in the low speed drive circuit is operated by the knob 66 to give a variable rate of low speed drive.

Figure 8:
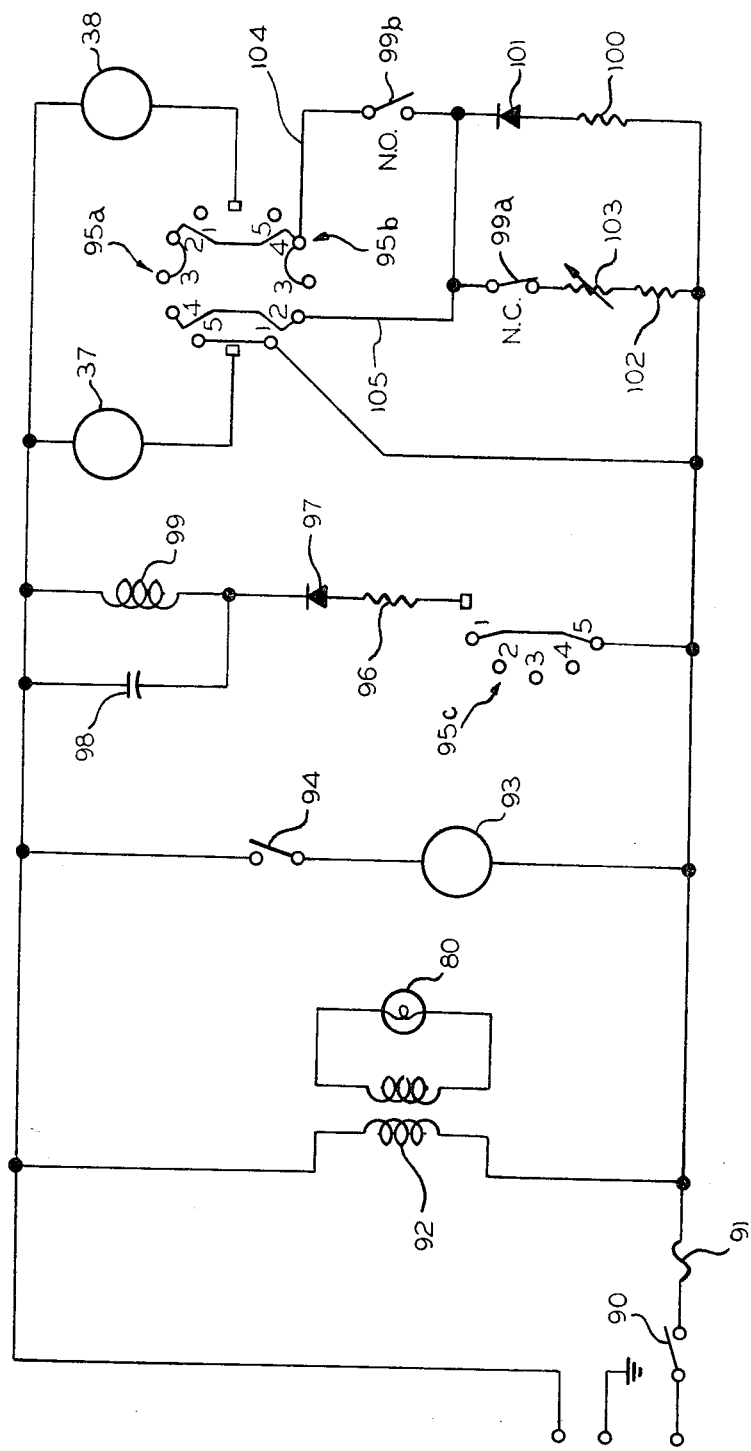
FIG. 8 is a schematic view of the electrical circuits of the film reader.

The schematic wiring circuit is shown in FIG. 8. It has a conventional on-off switch 90 and overload fuse 91. The lamp 80 is energized by a 6-volt transformer 92 connected across the AC mains. A fan motor 93 for a cabinet cooling fan (not shown) and a thermal cut-off switch 94 are also connected across the AC mains.

The film drive embodies two shaded pole induction motors 37 and 38. These motors are rotatable in opposite directions and the energization and deenergization is controlled through a five-position, two-wafer, three-pole detented rotary selector switch 95. The switch has an upper bank or wafer providing switch contact series 95a and 95b and a lower bank or wafer providing switch contacts 95c. Each set of switch contacts has five positions numerically designated as 1–5 in FIG. 8. Position 3 is the off or full stop position. Positions 2 and 4 are the slow speed drive positions while positions 1 and 5 are the high speed drive positions. Positions 1 and 2 are associated with one motor, and positions 4 and 5 with the other motor.

The right-hand motor 37 drives the forward drive spindle (right-hand spindle as viewed in FIG. 1) through the aforesaid reduction gear at approximately 400 rpm at the high speed and at approximately 1 to 10 rpm at the low speed. The left-hand motor 38 drives the left-hand rewind spindle in a rotary direction opposite to the forward drive spindle at the same high and low speeds. At high speed, the film moves at a linear rate of about five feet per second. At the slow speed, it moves at a variable rate of about 0.15 to 1.5 inches per second.

With the switch 95 in the 1 or 5 position, the resistor 96, diode 97, capacitor 98 and relay 99 are connected across the mains. The energizing of relay 99 opens the normally closed contact 99a and closes the normally open contact 99b.

When the switch 95 is switched to slow speed positions 2 or 4, the circuit through switch wafer 95c is opened, thereby deenergizing this circuit. The relay 99, however, remains energized over a brief interval by virtue of the discharge of capacitor 98, which is connected in parallel with the relay 99. With relay switch 99b still closed, direct current voltage is applied for this short interval at positions 2 and 4 of switch contact series 95a and 95b through parallel circuits including the resistor 100, diode 101, conductor 104 and relay switch 99b, and conductor 105. This applied direct current voltage applies a brief slow speed drive in opposite directions to both motors, thus giving a DC braking action on both motors over this brief interval.

If the switch 95 is left in position 2 or 4, the relay 99 is deenergized after the capacitor 98 has discharged, whereupon relay switch 99b opens and relay switch 99a closes. When the latter switch closes, one or the other of motors 67 and 68 is energized through a parallel circuit including the resistor 102, variable resistance potentiometer 103, relay switch 99a, in one branch (the AC shunt circuit) and resistor 100 and diode 101 in the other branch, both branches being connected to conductor 105 and switch position 2 or 4. The motor continues to run at the lower speed range under a combination of direct current from the diode 101 and alternating current from the shunt circuit. Resistor 102 governs the maximum speed at the lower speed range while potentiometer 103 introduces a variable resistance factor to allow the motor speed to be varied in accordance with its setting. When the switch 95 is turned to position 3, both motor circuits are deenergized. The deenergization of the driving motor rotating at the slow speed range requires no external braking. The film immediately stops due to the friction and/or drag in the various parts of the system.

The motors 37 and 38 preferably have a pronounced "hook" in their torque speed curve. This aids in providing two distinct speed ranges — a high, relatively fixed, near no load, speed range and a very low speed range.

The dynamic vibration absorber is particularly advantageous when used in electric motor drives having a slow speed drive circuit of the aforesaid type. A strong, visually apparent 60-cycle per second vibration is produced in the drive by the shaded pole motors 67 and 68 when they are run with partially rectified alternating current. The vibration suppression is highly effective and permits a very low motor speed drive, which is needed in the subject reeling apparatus for film readers. Vibration isolaters of the mechanical filter type, which use a spring and a mass, give a faster running of the motors in the slow speed range.

The vibration absorber resonant frequency is determined by the ratio of polar moment of inertia of the metal ring to the torsional stiffness of the spring system according to the formula:

$$2\pi f = \sqrt{k/I}$$

$f$ = frequency $\quad k$ = torsional stiffness
$I$ = polar moment of inertia

The polar moment of inertia of the metal ring 51 is readily computed from its mass and dimensions. The spring stiffness is easily determined for common types of springs, such as ordinary torsion springs or rods. The springs 52 and 53 are the equivalent of a composite of a helical torsion spring and a cantilever spring with a fixed end. The stiffness of this shape of spring is not easy to calculate accurately. The stiffness of these springs is best approximated mathematically, after which the exact value is determined by experiment. The composite cantilever-helical torsion springs 52 and 53 constitute the preferred shape in terms of strength characteristics and ease of manufacture. With these spring shapes and their coplanar orientations, however, a limit on the relative rotation between the ring 51 of the hub 61 should be provided to limit relative rotation when the drive spindles and their dynamic vibration absorbers braked suddenly at high speed. The aforedescribed plate 55 and pins 58 and 59 serve this function.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A strip reeling apparatus comprising a drive spindle, a rewind spindle, a first electric motor driving said drive spindle in one direction of rotation, a second electric motor driving said rewind spindle in the opposite direction of rotation, and dynamic vibration absorber means on and rotatable with at least one of said spindles and embodying a mass supported by spring wires having a torsional stiffness which provides resonance of said means at a frequency of 60 cycles per second.

2. Apparatus as claimed in claim 1 wherein said dynamic vibration absorber means comprises a hub on said spindle, said mass being a metal ring concentric with said hub, and a pair of spring wires interconnecting said hub and said ring and supporting said ring on said hub.

3. Apparatus as claimed in claim 2 wherein said pair of spring wires lie in a plane substantially normal to the axis of rotation of said spindle and further comprise substantially symmetric arcuate spring wires.

4. A strip reeling apparatus comprising a drive spindle, a rewind spindle, a first electric motor driving said drive spindle in one direction of rotation, a second electric motor driving said rewind spindle in the opposite direction of rotation, a hub on said spindle, a metal ring concentric with said hub, and a pair of spring wires interconnecting said hub and said ring and supporting said ring on said hub, said pair of spring wires lying in a plane substantially normal to the axis of rotation of said spindle and further comprising substantially symmetric arcuate spring wires and the ends of said spring wires being substantially straight segments secured respectively in said hub and said ring substantially at right angles to each other, said hub, metal ring and pair of spring wires being dynamic vibration absorber means adapted to resonate at a frequency of 60 cycles per second.

5. Apparatus as claimed in claim 4 wherein said spring wires have a 270° spiral arc.

6. Apparatus as claimed in claim 3 wherein said spring wires have a 270° spiral arc.

7. A strip reeling apparatus comprising a drive spindle, a rewind spindle, a first electric motor driving said drive spindle in one direction of rotation, a second electric motor driving said rewind spindle in the opposite direction of rotation, and dynamic vibration absorber means on and rotatable with at least one of said spindles and adapted to resonate at a frequency of 60 cycles per second, at least one of said motors being a shaped pole motor, circuit means for energizing said motor at slow speed with partially rectified alternating current, and said dynamic vibration absorber means being on and rotatable with the spindle for said shaded pole motor.

8. A dynamic vibration absorber comprising a hub, a metal ring concentric with said hub, and a pair of spring wires interconnecting said hub and said ring and supporting said ring on said hub, the mass of said ring and the torsional stiffness of said spring wires providing resonancy of said vibration absorber at a frequency of 60 cycles per second.

9. A dynamic vibration absorber as claimed in claim 8 wherein said pair of spring wires lie in a plane substantially normal to the axis of rotation of said hub and further comprise substantially symmetric arcuate spring wires.

10. A dynamic vibration absorber comprising a hub, a metal ring concentric with said hub, and a pair of spring wires interconnecting said hub and said ring and supporting said ring on said hub the ends of said spring wires being substantially straight segments secured respectively in said hub and said ring substantially at right angles to each other.

11. A dynamic vibration absorber as claimed in claim 10 wherein said spring wires have a 270° spiral arc.

12. A dynamic vibration absorber comprising a hub, a metal ring concentric with said hub, and a pair of spring wires interconnecting said hub and said ring and supporting said ring on said hub, a pair of spring wires lying in a plane substantially normal to the axis of rotation of said hub and further comprising substantially symmetric arcuate spring wires, and said spring wires having a 270° spiral arc.

* * * * *